United States Patent
Le Polles

(10) Patent No.: US 10,774,737 B2
(45) Date of Patent: Sep. 15, 2020

(54) CLEANING INSTALLATION FOR AN INTERNAL COMBUSTION ENGINE

(71) Applicant: FLEX FUEL—ENERGY DEVELOPMENT, Valbonne (FR)

(72) Inventor: Sébastien Alain Le Polles, Montigny-sur-Loing (FR)

(73) Assignee: Flex Fuel—Energy Development, Valbonne (FR)

( * ) Notice: Subject to any disclaimer, the term of this patent is extended or adjusted under 35 U.S.C. 154(b) by 0 days.

(21) Appl. No.: 16/495,964

(22) PCT Filed: Mar. 19, 2018

(86) PCT No.: PCT/IB2018/051818
§ 371 (c)(1),
(2) Date: Sep. 20, 2019

(87) PCT Pub. No.: WO2018/172907
PCT Pub. Date: Sep. 27, 2018

(65) Prior Publication Data
US 2020/0032701 A1     Jan. 30, 2020

(30) Foreign Application Priority Data
Mar. 20, 2017 (FR) ..................... 17 70269

(51) Int. Cl.
*F02B 77/04* (2006.01)
*F02M 26/01* (2016.01)
*F01N 3/08* (2006.01)

(52) U.S. Cl.
CPC ................ *F02B 77/04* (2013.01); *F01N 3/08* (2013.01); *F02M 26/01* (2016.02); *F01N 2260/06* (2013.01); *F01N 2610/146* (2013.01); *F01N 2900/102* (2013.01)

(58) Field of Classification Search
CPC . F02B 77/04; F02M 26/01; F01N 3/08; F01N 2260/06; F01N 2610/146; F01N 2900/102
See application file for complete search history.

(56) References Cited

U.S. PATENT DOCUMENTS

| 2,201,774 A | 5/1940 | Hofele |
| 2009/0133718 A1 | 5/2009 | Lebold et al. |
| 2016/0010547 A1 | 1/2016 | Wicks |

FOREIGN PATENT DOCUMENTS

| DE | 10 2015 110970 | 1/2016 |
| EP | 3 023 613 | 5/2016 |
| EP | 3 064 740 | 9/2016 |

*Primary Examiner* — Jacob M Amick
*Assistant Examiner* — Charles Brauch
(74) *Attorney, Agent, or Firm* — Occhiuti & Rohlicek LLP

(57) ABSTRACT

An apparatus for cleaning a motorization system includes an injector that injects cleaning fluid into an inlet of an internal-combustion engine, a diagnostic device that determines the system's soiling level as a function of intrinsic parameters thereof, and a controller that supplies the injection device with cleaning parameters that depend on the soiling level. The motorization includes the engine and a gas-circulation circuit having pipes and moving parts arranged to feed the inlet a gas mixture for combustion.

13 Claims, 1 Drawing Sheet

CLEANING INSTALLATION FOR AN INTERNAL COMBUSTION ENGINE

CROSS REFERENCE TO RELATED APPLICATION

This application is the national phase under 35 USC 371 of international application no. PCT/IB2018/051818, filed Mar. 19, 2018, which claims the benefit of the Mar. 20, 2017 priority date of French application no. 17/70269.

TECHNICAL FIELD AND PRIOR ART

The invention concerns an installation for cleaning a motorisation system comprising an internal combustion engine, the installation being of the type comprising an injection device adapted to inject a cleaning fluid into an inlet of the engine when running. The invention is in particular of benefit for the maintenance of motor vehicles, such as cars, motorcycles, boats, . . . , but also for the maintenance of industrial engines such as those used for the production of energy, . . . .

To optimize the operation of a motorisation system, the aim is often to lower the combustion temperature and to have an optimum air/fuel stoichiometric ratio available in the engine when running. A lowered combustion temperature enables improvement of the performance of the motorisation system and, in particular in the case of diesel motorisation systems, reduced production of NOx, particularly polluting nitrogen oxide compounds.

One technique developed in the 1970's for lowering the combustion temperature consists in redirecting some of the inert exhaust gases to the fuel-air mixture inlet of the engine. An EGR (exhaust gas recirculation) valve with variable flow rate is positioned on the recirculation circuit between the exhaust outlet and the admission inlet; the degree of opening of the valve is controlled by a computer of the vehicle, as a function of parameters of the motorisation system such as a measured temperature of the exhaust gases, a power required from the engine, . . . . The production of nitrogen oxides depending in particular on the temperature and on the presence of oxygen during combustion, the introduction of burned gases operates on both parameters (temperature and proportion of oxygen).

Although reducing the combustion temperature enables reduction at lower cost of the production of NOx and enhancement of the performance of the motorisation system, it has disadvantages.

The combustion in the engine is reduced (among other reasons because of the reduced oxygen content), and therefore generates more unburned hydrocarbons and therefore more particles and soot. A notable consequence of this is to soil the gas inlet circuit, the burned gases exhaust circuit and the exhaust gas recirculation circuit. Solid carbon residues (also known as coke or calamine) in considerable quantities are therefore formed in the intake manifold, the turbocompressor and the EGR regulation valve, sometimes to a point such that engine fault and other messages can occur. The EGR regulation valve can also stick in the open position, with the result that on full load a large quantity of exhaust gas is mixed with the combustion air. In the case of a motor vehicle, a cloud of black smoke and a loss of power are then observed when the vehicle accelerates. Combustion at low temperature therefore reduces the efficiency of the motorisation system and increases the pollution generated by the motorisation system.

A known technique for cleaning the motorisation system and its circuits consists in injecting a cleaning fluid such as a mixture of hydrogen and oxygen gas into the inlet circuit while the engine is running. The oxidation of the hydrogen enhances combustion which generates water vapour and carbon dioxide gas; at high temperature, the water vapour and the carbon dioxide gas react with the calamine and therefore enable elimination of the calamine. The patent application FR 15/02059 of the same applicant describes an installation for the implementation of this technique.

DESCRIPTION OF THE INVENTION

The invention aims to improve the efficiency of a known installation for cleaning a motorisation system; the motorisation system comprises an internal combustion engine and a gas circulation circuit; the engine comprising a plurality of inlets configured for receiving products to be burned and an exhaust gas outlet; the gas circulation circuit comprises a plurality of pipes and a plurality of moving parts arranged together to feed to one of the inlets of the engine an appropriate gas mixture.

The cleaning installation according to the invention is of the type comprising an injection device adapted to inject a cleaning fluid into one of the inlets of the engine.

The installation according to the invention is characterized in that it also comprises diagnostic means adapted to determine a level of soiling of the motorisation system as the function of intrinsic parameters of the motorisation system and control means for the injection device adapted to control the injection device as a function of the level of soiling of the motorisation system.

The injection of fluid is therefore adjusted taking into account a level of soiling of the motorisation system depending on intrinsic parameters of the motorisation system, such as for example the geometry of the engine, the number and the diameter of the cylinders, . . . , for increased effectiveness of the cleaning.

Preferably, the diagnostic means are adapted to determine the level of soiling of the motorisation system as a function of the intrinsic parameters of the motorisation system and conditions of use of said motorisation system, to improve further the effectiveness of the cleaning. The parameters linked to the conditions of use of the motorisation system will be detailed later.

In an installation according to the invention, the control means are adapted:

as a function of the level of soiling of the motorisation system, to determine cleaning parameters of a cleaning sequence comprising a plurality of cleaning cycles, said cleaning parameters comprising in particular for each cycle a duration of said cleaning cycle and/or a quantity of fluid to be injected during said cleaning cycle, and to transmit the cleaning parameters so determined to the injection device for the execution of the cleaning sequence associated with the level of soiling.

The parameters of a cleaning sequence are therefore well suited to the motorisation system to be treated, where applicable also taking into account the general state of the motorisation system, said state depending on the use that has been made of it.

The parameters of a cleaning sequence can comprise a number of cleaning cycles. They can also comprise for each cleaning cycle:
a temperature and/or a pressure of the injected fluid, and/or
a flow rate of fluid to be injected, and/or a composition of the fluid to be injected, in particular a proportion of hydrogen, and/or a duration of the cleaning cycle.

For the most soiled motorisation systems, the cleaning sequence can therefore comprise a plurality of cycles possibly having different parameters, for example different cycle duration and/or quantity of fluid to be injected parameters. The initial determination of the level of soiling of the motorisation system to be cleaned enables optimization of the parameters of the various cycles.

Finally, in the installation according to the invention, the control means can also be adapted to determine, as a function of the intrinsic parameters and the conditions of use of the motorisation system, a duration of use of the motorisation system from which the next cleaning is desirable. Depending on the motorisation system, the duration of use can be defined by a number of hours of operation or a number of kilometres travelled. This enables programming for the future preventive cleaning of the motorisation system, before the soiling of the motorisation system leads to a loss of performance and an increase in pollution generated by the motorisation system.

BRIEF DESCRIPTION OF THE FIGURES

The invention will be better understood, and other features and advantages of the invention will become apparent in the light of the following description of examples of an installation according to the invention for cleaning a motorisation system. These examples are non-limiting examples. The description is to be read in conjunction with the appended drawing in which.

DESCRIPTION OF AN EMBODIMENT OF THE INVENTION

Figure 1:
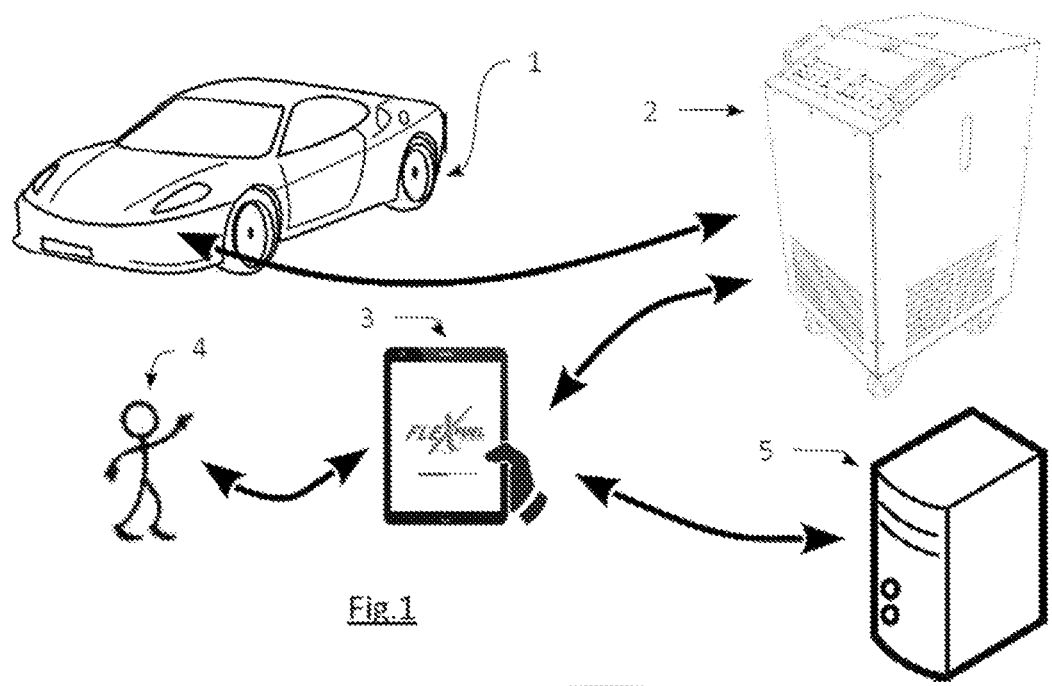
FIG. 1 is an overall view of an installation according to the invention in its operating environment.
Figure 2:
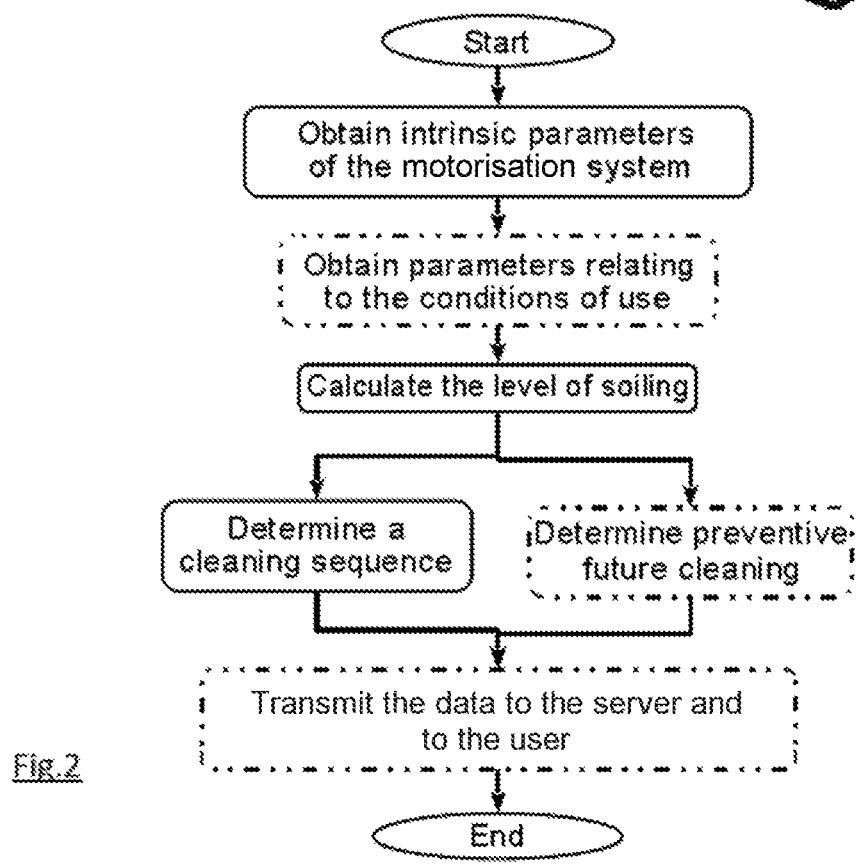
FIG. 2 is a diagram used in describing a mode of operation of an installation according to FIG. 1.

As previously stated, the installation according to the invention is an installation for cleaning a motorisation system comprising a motorisation system 1 with an internal combustion engine and a gas circulation circuit.

In a known manner, the engine comprises a plurality of inlets configured for receiving products to be burned and an exhaust gas outlet; the gas circulation circuit for its part comprises a plurality of pipes and a plurality of moving parts arranged together to feed to one of the inlets of the engine an appropriate gas mixture. According to one embodiment, the engine comprises a single inlet, adapted to receive a gas mixture containing in particular air, fuel, and possibly some of the exhaust gases. According to another embodiment, the engine comprises at least two inlets, an inlet configured for receiving a gas mixture containing in particular air and possibly some of the exhaust gases, and an inlet configured for receiving fuel (so-called direct injection engine).

The moving parts comprise in particular an inlet valve enabling regulation of the quantity of gas mixture injected into the engine via the inlet configured for receiving the gases, commonly referred to as the induction inlet. A computer of the motorisation system controls the movements of the moving parts of the motorisation system, notably the degree of opening of the inlet valve as a function of the performance expected of the motorisation system. Over time and as the engine is used, deposits of soot progressively limit the movements of the moving parts and the usable section of the pipes for feeding gas into the engine.

The cleaning installation comprises an injection device adapted to inject a cleaning fluid into one of the inlets of the engine. In one embodiment, the cleaning fluid is a mixture of hydrogen and oxygen and the installation is completely autonomous in the sense that it produces for itself the cleaning fluid that it uses. To this end the installation comprises, in a box-form structure 2, a tank of water and means known from elsewhere for producing hydrogen and oxygen by a process of electrolysis of the water. The installation also comprises a fluid injection device adapted to inject the cleaning fluid into one of the inlets of the engine to be cleaned. If the engine comprises a single inlet adapted to receive a gas mixture containing in particular air and fuel, an outlet of the injection device of the cleaning installation is connected to said inlet, on the upstream side of the inlet valve. If the engine comprises at least two inlets, the outlet of the injection device of the cleaning installation can be connected either to the inlet configured for receiving a gas mixture containing in particular air or to the inlet configured for receiving fuel (so-called direct injection engine).

A user interface 3 (also known as a human/machine interface or H/M interface) enables the user 4 to adjust the installation, to enter parameters necessary for the operation of the installation (notably information on the vehicle to be cleaned), to trigger a cleaning sequence, to be informed of the progress of a cleaning sequence in progress, . . . . The user interface comprises in particular an information display screen, means for transmitting information to the cleaning installation and means for selecting information displayed on the screen at a given time. According to one embodiment, the user interface can be positioned on the structure (the box) of the cleaning installation, and the selection means consist for example of a mouse enabling the movement of a cursor on the screen, a touch-sensitive layer covering the display screen, etc. According to another embodiment, the user interface can be an electronic device such as a smartphone, a touch-screen tablet or a laptop computer connected to the structure by a preferably wireless connection.

More particularly in the context of the invention, the installation also comprises means for diagnosing a motorisation system and means for controlling the injection device to carry out a treatment of the motorisation system appropriate to the diagnosis obtained.

From a practical implementation point of view, in the example employed, the diagnostic means and the control means consist of a microprocessor associated with a program memory; the microprocessor and the program memory can be installed in the structure (box) of the installation according to the invention, or in the remote user interface. The microprocessor can be connected to the computer controlling the overall operation of the motorisation system to be cleaned and in particular the movements of the moving parts. The microprocessor is also connected to the injection device the operation of which it controls. The microprocessor can also be connected to a database of the technical characteristics of a plurality of motorisation systems. The database is stored in a data memory, in the cleaning installation, in the remote user interface or in a remote data server 5.

The program memory stores a program that can be executed by the microprocessor; said program comprises a plurality of lines of code appropriate to implementing the technical functions of the diagnostic means and the functions of the control means in the context of the invention.

The diagnostic means according to the invention are adapted to determine the level of soiling of the motorisation system as a function of intrinsic parameters of the motorisation system; in the example employed, the diagnostic means also take into account parameters relating to conditions of use of said motorisation system.

The following intrinsic parameters of the motorisation system and parameters relating to the conditions of use of said motorisation system can be taken into account:

the intrinsic parameters of the engine such as the geometry of the engine, the engine displacement, the number of cylinders, the volume of a cylinder, the type of fuel, . . . , the air flow rate, the exhaust gas flow rate admitted into a cylinder in nominal operation, the intrinsic parameters of the depollution systems associated with the motorisation system (for example an exhaust gas recirculation circuit with EGR valve and/or a particle filter FAP), the intrinsic parameters of the turbocompressor.

The intrinsic parameters of the motorisation system can be supplied by a user of the installation before triggering a diagnosis followed by cleaning. Alternatively, the diagnostic means have access to the motorisation systems database storing, for each motorisation system identified by a unique reference, all of the parameters supplied by the manufacture of said motorisation system. In this case, the user simply selects the reference of the motorisation system in the database to transmit all of the parameters of the motorisation system to the diagnostic means.

The following parameters relating to the conditions of use of the motorisation system can in particular be taken into account:

a duration of use of the motorisation system, duration defined for example by a number of kilometres travelled by the vehicle in which the motorisation system is installed, a number of hours of operation of an industrial machine in which the motorisation system is installed, . . . , a date of starting of operation of the motorisation system (or a date of starting circulation of the vehicle), a weighting coefficient determined as a function of a normal situation in which the motorisation system is used most often (for example for a vehicle, use in town, on roads, on motorways, mixed), a weighting coefficient determined as a function of the type of fuel used with the motorisation system, a weighting coefficient determined as a function of any additive added to the fuel of the motorisation system with a view to limiting its level of soiling, . . . .

Parameters such as the weighting coefficients are provided by the user. A parameter such as a duration of use of the motorisation system to be cleaned can be supplied by the user via the H/M interface after reading off a number of hours or of kilometres displayed on a meter associated with the motorisation system. Alternatively, the duration of use can be transferred directly to the diagnostic means by a data transfer device coupled to an hours or kilometres meter associated with the motorisation system or, in the case of a vehicle, coupled to the OBD (On Board Diagnostic) system of said vehicle.

The weighting coefficient as a function of a normal situation in which the motorisation system is used most often is for example determined from a state table associating a weighting coefficient with each qualitative value from a set of qualitative values representative of possible situations of use of the motorisation system. The choice of a qualitative value in the set of qualitative values is for example effected manually by the user via the user interface. The diagnostic means then give a value of the weighting coefficient as a function of the selected qualitative value.

For example, for a so-called "light" vehicle such as a car for personal use or a small utility vehicle, three normal travel situations can be defined by the following set of four qualitative values: {URBAN, ROAD, MOTORWAY, MIXED}. The "URBAN" value is chosen when the vehicle is used most often in an urban environment; such use is characterized by very frequent, rapid and fairly large amplitude variations of speed and engine speed, leading to serious soiling of the motorisation system. The "ROAD" value is chosen when the vehicle is used most often on the road and outside any conurbation; such use is characterized by a more stable speed and engine speed, with changes of speed or engine speed less frequent and less rapid, reflected in moderate soiling of the motorisation system.

The "MOTORWAY" value is chosen when the vehicle is used most often on motorways and outside any conurbation; such use is characterized by a more stable speed and engine speed and greater speeds, reflected in low soiling of the motorisation system. The "MIXED" value is chosen when the vehicle is used both in and outside any conurbation. For example, the state table can be as follows:

qualitative value MOTORWAY ROAD MIXED URBAN
weighting coefficients linked to use 0.25 0.35 0.5 0.75

The weighting coefficient linked to use can be refined by increasing the number of qualitative values and defining more precisely the weighting coefficient linked to each qualitative value.

The control means of the injection device are adapted to control the injection device as a function of a level of soiling of the motorisation system. To be more precise, as a function of the level of soiling of the motorisation system, the control means determine a cleaning sequence appropriate for the level of soiling of the motorisation system and send the cleaning device appropriate control signals to execute the cleaning sequence so determined.

A cleaning sequence comprises at least one cleaning cycle defined in particular by a duration of injection of cleaning fluid and/or a quantity of fluid to be injected. Optionally, a cleaning cycle can be specified by complementary parameters such as for example a temperature and/or a pressure of the injected fluid and/or a composition of the fluid to be injected (proportion of hydrogen, . . . ). A cleaning sequence can further comprise a plurality of cycles, and each cleaning cycle can be characterized by cleaning parameters differing from one cycle to another.

For example, for a moderately soiled vehicle motorisation system, having a level of soiling of the order of 50 to 70%, a cleaning sequence could comprise a single cycle, with a cycle duration of the order of 30 minutes to 4 hours, a fluid flow rate of the order of 250 l/h to 1000 l/h, the fluid being a stoichiometric mixture of hydrogen and oxygen gas.

In another example, for a more heavily soiled motorisation system, having a level of soiling of the order of 70 to 90%, a cleaning sequence could comprise a plurality of cycles, with cycle durations and fluid flow rates that increase as the cycles are performed. The first cycle will enable removal of the most recent soot deposits and therefore those with the lowest adhesion, the subsequent cycles will attack the older deposits of soot, with greater adhesion to the walls of the EGR valve, the cylinders, . . . .

The control means can optionally also be adapted to determine, as a function of intrinsic parameters and conditions of use of the motorisation system, a duration of use from which a next cleaning is desirable, with a view to preventive maintenance. This can be effected after the determination of the level of soiling, before, during or after the cleaning sequence. The information can be displayed on the user interface for example.

LEGEND

1: Vehicle
2: Cleaning installation
3: Human/machine interface
4: User
5: Server The arrows in thick line show the streams of data between the various entities (vehicle, cleaning installation, user, server) participating in the execution of the method according to the invention

The invention claimed is:

1. An apparatus for cleaning a motorization system, said apparatus comprising an injector, a diagnostic device, and a controller, wherein said injection device is configured to inject cleaning fluid into an inlet of an engine, wherein said diagnostic device is configured to determine a level of soiling of said motorization system as a function of intrinsic parameters of said motorization system, wherein said controller is configured to supply cleaning parameters to said injection device, said cleaning parameters being a function of said level of soiling, wherein said motorization system comprises said engine and a gas circulation circuit, wherein said engine is an internal-combustion engine, wherein said engine comprises an exhaust gas outlet, wherein said inlet is one of a plurality of inlets configured for receiving products to be burned, and wherein said gas-circulation circuit comprises pipes and moving parts arranged together to feed said inlet a gas mixture that for combustion.

2. The apparatus of claim 1, wherein said diagnostic device is configured to determine said level of soiling as a function of said intrinsic parameters and parameters relating to conditions of use of said motorization system.

3. The apparatus of claim 2, wherein said parameters relating to conditions of use include a distance travelled by said motorization system.

4. The apparatus of claim 2, wherein said parameters relating to conditions of use include a duration of use of said motorization system.

5. The apparatus of claim 2, wherein said parameters relating to conditions of use comprise a weighting coefficient, wherein said weighting coefficient is determined by a state table that associates a weighting coefficient with each qualitative value from a set of qualitative values, and wherein said qualitative values represent possible situations of use of the motorization system.

6. The apparatus of claim 5, wherein said qualitative values represent traffic conditions in which said motorization is most likely to be used, said traffic conditions being related to an expected extent of soiling of said motorization system.

7. The apparatus of claim 1, wherein said controller is configured to determine cleaning parameters of a cleaning sequence and to transmit said cleaning to said injector for execution of said cleaning sequence, wherein said cleaning sequence comprises a plurality of cleaning cycles, wherein said controller determines said cleaning parameters as a function of said level of soiling, and wherein said cleaning sequence is associated with said level of soiling, wherein said cleaning parameters comprise a parameter selected from the group consisting of duration of said cleaning cycle and quantity of fluid to be injected during said cleaning cycle.

8. The apparatus of claim 7, wherein said cleaning parameters comprise a number of cleaning cycles.

9. The apparatus of claim 7, wherein said cleaning parameters include, for each cleaning cycle, a temperature of said injected fluid.

10. The apparatus of claim 7, wherein said cleaning parameters include, for each cleaning cycle, a pressure of said injected fluid.

11. The apparatus of claim 7, wherein said cleaning parameters include a composition of said cleaning fluid.

12. The apparatus of claim 7, wherein said cleaning parameters include a proportion of hydrogen in said cleaning fluid.

13. The apparatus of claim 2, wherein said controller is configured to determine for how long said motorization is to be used until another cleaning thereof is to be performed and to do so based at least in part on said intrinsic parameters and said conditions of use.

* * * * *